Feb. 13, 1940.    L. G. BOWEN    2,189,776
SPEED REDUCER
Filed April 28, 1938    2 Sheets-Sheet 1

INVENTOR
LESLIE G. BOWEN
BY Alfred R. Fuchs
ATTORNEY

Feb. 13, 1940.  L. G. BOWEN  2,189,776
SPEED REDUCER
Filed April 28, 1938   2 Sheets-Sheet 2

INVENTOR
LESLIE G. BOWEN
BY Alfred R. Fuchs
ATTORNEY

Patented Feb. 13, 1940

2,189,776

UNITED STATES PATENT OFFICE 2,189,776

SPEED REDUCER

Leslie G. Bowen, Kansas City, Mo.

Application April 28, 1938, Serial No. 204,807

3 Claims. (Cl. 74—305)

My invention relates to speed reducing devices, and more particularly to a speed reduction gearing.

It is a purpose of my invention to provide a speed reducing gearing that is capable of producing a very large reduction in speed by the use of a simple gear arrangement employing a small number of toothed members, and which is very compact and simple in construction.

It is a further purpose of my invention to provide a device of the above mentioned character, in which practically any desired speed reduction between the driving and the driven shaft can be obtained, and in which the same structure can be utilized for driving the driven member either in the same direction as the driving member or in a reverse direction to that of the driving member, this being dependent upon the difference in the gear ratio between the gears carried by and rotating with the driving member, and a fixed and a freely rotatable ring gear, respectively, said rotatable ring gear being rotatable as a unit with the driven member.

More particularly my invention comprises a driving shaft, about which a member carrying a plurality of toothed members is rotatable, said driving member having a pair of gears thereon, one of which meshes with certain of said toothed members and the other of which meshes with the others of said toothed members, the toothed members being all rotatable on axes on said rotatably mounted member, and the toothed members that mesh with said one gear meshing with a fixed internal ring gear to cause the positive rotation of said rotatably mounted member at a certain rate relative to the drive shaft, the other rotatable toothed members engaging a ring gear that is rotatably mounted causing, due to the combined action of the member rotatably mounted about the drive shaft and the gear rotating with the drive shaft, a rotation of the rotatably mounted internal ring gear and the driven member, which is driven by means of said rotatably mounted ring gear.

It is an important purpose of my invention to provide a device of the above mentioned character, which is highly efficient in operation, the losses in the gearing being reduced to a minimum by providing a ball bearing anti-friction mounting for the rotatably mounted ring gear member and for the rotatably mounted member that carries the two series of toothed members meshing with the gears on the drive shaft, whereby friction losses in the drive shaft are reduced to a minimum.

Other objects and advantages of my invention will appear as the description of the drawings proceeds. I desire to have it understood, however, that I do not intend to limit myself to the particular details shown or described, except as defined in the claims.

Figure 1:
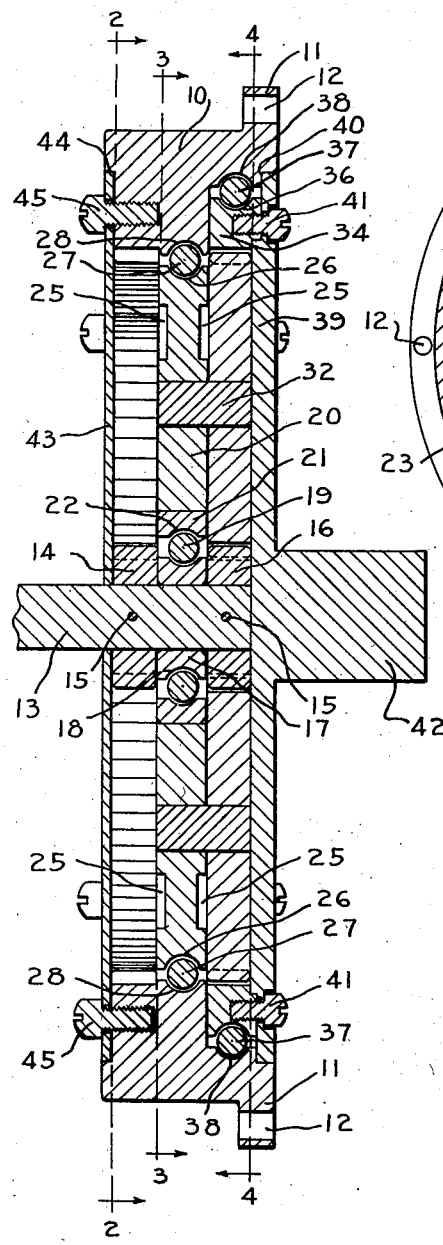
Fig. 1 is a transverse sectional view diametrically through my speed reduction device, which is taken substantially on the line 1—1 of Fig. 2.

Referring in detail to the drawings, my improved speed reduction device comprises a casing or housing 10, which is of an annular character, and which is provided with any suitable means for securing the same to a frame, such as the flange 11, having openings 12 therein, through which securing elements may be passed. Mounted within the housing or casing 10 is a driving shaft 13, said driving shaft extending into said housing from any suitable means for rotating the same.

Mounted on said drive shaft is a gear 14, which is secured thereto so as to rotate therewith in any desired manner, as by means of the pin 15. Spaced lengthwise of the shaft 13 from the gear 14 is a gear 16, which is also fixed to rotate with the shaft, as by means of a pin 15. Mounted between the gears 14 and 16 on the shaft 13 is a collar or ring 17, which is provided with a ball race 18, in which the bearing balls 19 roll.

A disk-like member 20 is mounted within the casing 10 and has a ring 21 provided on the inner face thereof, which is provided with a ball race 22, in which the bearing balls 19 operate. Said disk-like member 20 is provided with a plurality of openings 23 and 24 for reducing the weight thereof, and is also recessed or grooved at 25 to further reduce the weight thereof. The outer periphery, or rim portion, of the disk-like member 20 is provided with a groove 26 therein, that serves as a ball race receiving the bearing balls 27. The casing 10 is provided with a ball race 28 on the inner periphery thereof, in which the bearing balls 27 roll. The disk-like member 20 is thus mounted for free rotation within the casing 10 and about the shaft 13.

The casing 10 is provided with an annular series of gear teeth 29, which form an internal ring gear integral with the casing 10 and thus held stationary.

ary with said casing on any suitable frame or support, on which said casing may be secured. Mounted on the disk-like member 28 are shafts 30, that have the toothed members or gears 31 mounted thereon, so that said members 31 are freely rotatable about the axes of the shafts 30 on the disk-like member 28. Said toothed members or gears 31 mesh with the teeth of the gear 14 and with the teeth 29 of the internal ring gear formed on the casing 10.

It will be obvious that, as the gear 14 is rotated with the shaft, the toothed members 31 will be rotated about their axes on the member 28 and will travel along on the annular series of teeth 29 carrying the disk-like member 28 therewith in the same direction as the shaft 13 rotates. Thus, if the direction of rotation of the gear 14 is in the direction of the arrow, indicated in Fig. 2, the members 31 will rotate in the direction of the arrows placed thereon, causing the members 31 to roll around on the toothed portion 29 of the casing 10 in the same direction as the gear 14 rotates and carrying the disk-like member around in the direction indicated by the arrow thereon in Fig. 2. The rate of rotation of the member 28 relative to the shaft 13 will be dependent upon the number of teeth provided on the gear 14 and the number of teeth 29 that the internal ring gear formed on the member 10 has. Thus, if the ring gear 29 has 108 teeth and the gear 14 has 20 teeth, the gear 14 will rotate 6.4 times for each rotation of the member 28.

The disk-like member 28 is also provided with a plurality of shafts 32, which rotatably mount the toothed members or gears 33 on the member 28. Said gears or toothed members 33 have the teeth thereof meshing with the teeth of the gear 16 on the shaft 13, said gear members or toothed members being freely rotatably mounted about the axes of the shafts 32 on the member 28. An internal ring gear 34 is mounted in the casing 10, being provided with the teeth 35, with which the teeth on the gears 33 mesh, and having an annular groove 36 therein for receiving the bearing balls 37 that operate in the groove 38 in the casing 10. Thus the ring-like member 34 is freely rotatably mounted within the casing.

It will be obvious that, if the gear 16 has the same number of teeth as the gear 14 and the internal ring gear 34 has the same number of teeth as the gear 29, there will be no rotation of the ring-like member 34 produced by the shaft 13, but if the number of teeth in either the gear 16 or the gear 34, or both thereof, are different from the number of teeth in the gear 14 and the gear 29, rotation of the member 34 must take place due to the fact that the rotation of the member 28 is positive about the shaft 13 and also the rotation of the gear 16 is positive about the shaft 13, thus making it necessary for the ring 34 to rotate about the shaft 13 to compensate for the difference in the gear ratio between the gears 14 and 29 and the gears 16 and 34. Such rotation of the ring-like member 34 may be transmitted to the driven member in any desired manner, but, preferably, this is accomplished by providing a disk-like member 39, which also serves as a cover plate for the device on one side thereof, said disk-like member fitting within an annular offset 40 provided in the member 10, and being secured to the ring-like member 34 by any suitable securing means, such as the headed screw-threaded members 41.

The disk-like member 39 is formed with a hub portion 42 projecting in axial alignment with the axle 13, to which any desired mechanism may be connected in any suitable manner for driving the same at a reduced speed. In order to provide an enclosure for the speed reduction device, so as to enable the same to be packed with grease and prevent the entrance of dirt within the same, a cover plate 43 is provided on the opposite face thereof from the member 39, which fits within an annular offset 44, provided in the member 10, and is secured to the casing member 10 by any suitable securing elements, such as the headed screw-threaded members 45.

Figure 2:
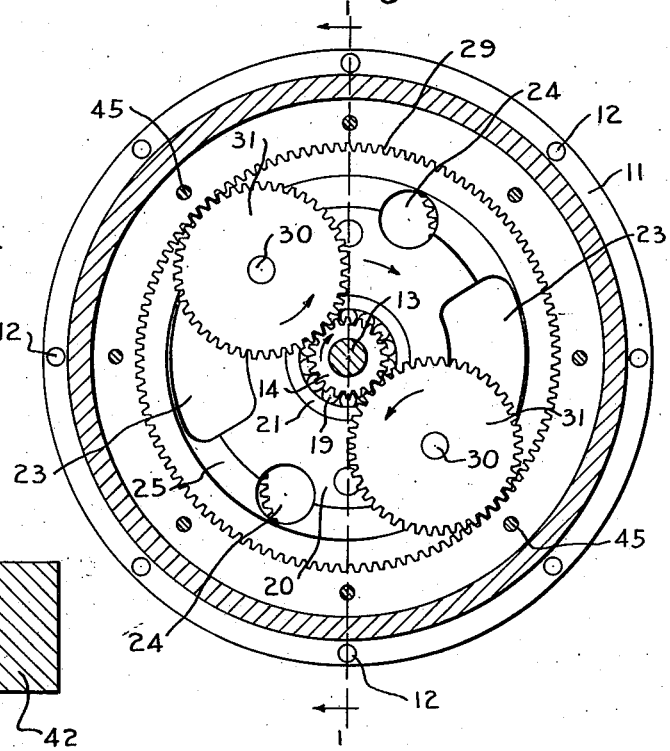
Fig. 2 is a section taken on the line 2—2 of Fig. 1 on a reduced scale.
Figure 3:
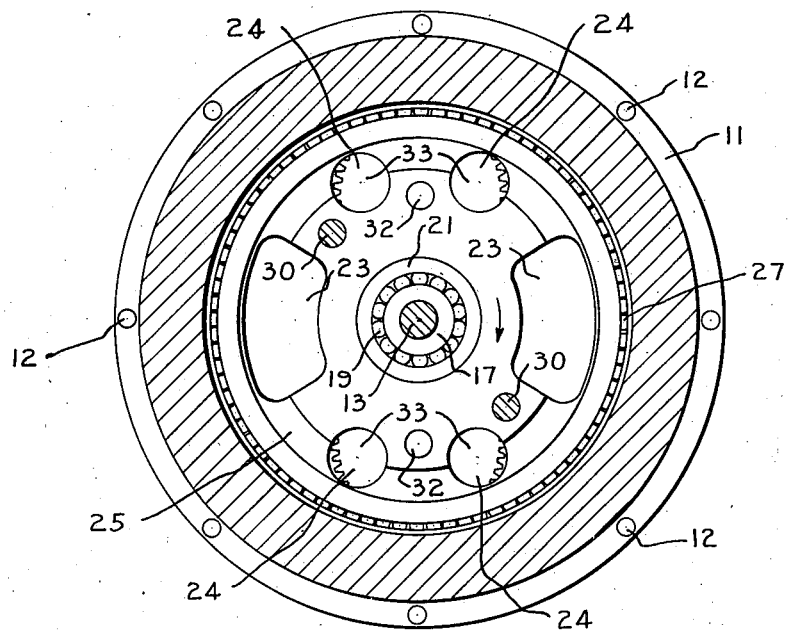
Fig. 3 is a section taken on the line 3—3 of Fig. 1, on a reduced scale.
Figure 4:
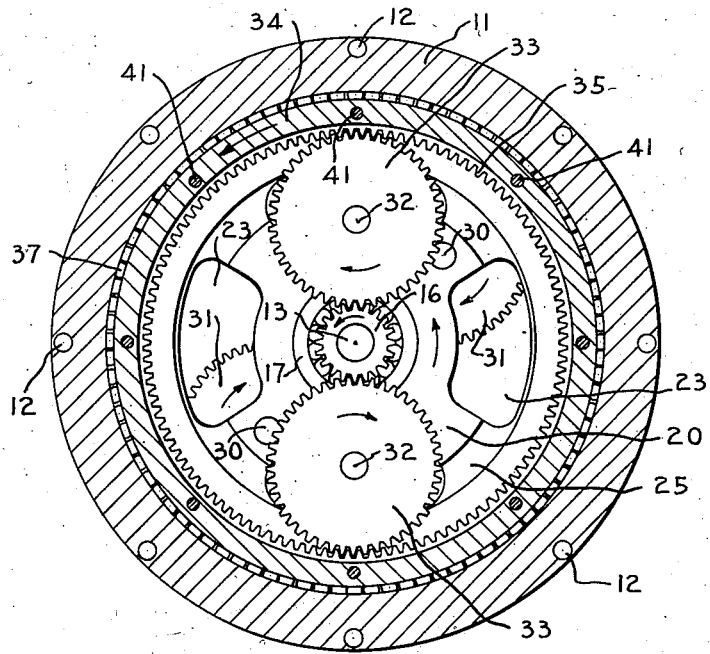
Fig. 4 is a section taken on the line 4—4 of Fig. 1, on a reduced scale.

The disk-like member 28 is being rotated in the direction indicated by the arrow in Figs. 2, 3 and 4, due to the rotation of the shaft 13 in the direction indicated by the arrow in Fig. 2. The gear 16, of course, rotates in the direction indicated by the arrow in Fig. 4, the section taken on the line 4—4 being taken facing in an opposite direction to Fig. 2. Accordingly the rotation of said gear 16 will cause rotation of the gears 33 in the direction indicated by the arrows in Fig. 4. While such rotation is taking place, however, the member 28 is rotating in the same direction as the gear 16, but at a much slower speed. If the number of teeth provided on the gears 14 and 29 are the same as previously stated, the shaft 13 and the gear 16 will make 6.4 revolutions for each single rotation of the member 28. If the gear 16 has the same number of teeth as the gear 14, that is, 20 teeth, and the number of teeth 35 on the ring gear 34 is more than the number of teeth on the ring gear 29, for example, 110 teeth on the member 34 to 108 on the member 29, it would require 6.5 revolutions of the gear 16 to cause the member 28 to make one revolution, if the ring 34 were fixed, but the member 28 makes one revolution for each 6.4 revolutions of the member 13, due to the fact that it is carried along at this rate of speed by the intermeshing of the gears 14, 31 and 29.

The member 34 being free to rotate, is thus carried along in the same direction as the member 28, with the member 16, enough to make up the difference between the amount of rotation of the member 28 required to carry the member 28 all the way around once within the member 34, if it were stationary, and the amount that it is actually rotated, due to the intermeshing of the gears 14, 31 and 29. In the instance described herein, with the number of teeth on the members 14 and 16 being 20, and the number of teeth 29 and 35 being 108 and 110, respectively, the ring-like member 34 is rotated in the same direction as the shaft 13, a distance of two teeth for every revolution of the member 28. If there are 110 teeth 35 on the member 34 it would require 55 revolutions of the member 28 to rotate the ring-like member 34 and the hub 42 once. However, the member 28 rotates once for every 6.4 revolutions of the shaft 13. Accordingly the shaft 42 will rotate once in the same direction as the shaft 13 for each 352 revolutions of the shaft 13.

It will be obvious that almost any desired reduction in speed can be obtained by the arrangement described. By varying the number of teeth on the gears 14 and 16 so that these have a different number of teeth, and leaving the number of teeth 29 and 35 the same, that is, by providing an equal number of teeth on both ring gears, but a different number of teeth on the gears on the driving shaft, a similar result can be obtained with, of course, a different reduction in speed. Also, both the number of teeth, that the gears 14 and 16 and the gears 29 and 34 have, may be varied to give still a different result. Thus, if the gear 14 is provided with 20 teeth, and the gear 29 has 110 teeth, it would require 6.5 revolutions of the shaft 13 to rotate the member 20 once. If the gear 16 is provided with 19 teeth and there are 105 teeth 35 on the gear 34, the rotation of the member 20, due to the number of teeth provided on the gears 13 and 29 will be such that the ring gear 34 will be carried in the same direction as the shaft 13, only one-half the distance of one tooth for each revolution of the member 20. It will thus require 210 revolutions of the member 20 to rotate the hub 42 once, and it will require 6.5 times that many revolutions of the shaft 13, or 1365 revolutions of the shaft 13 to rotate the hub, or driven member, 42 once.

Not only can my improved speed reduction drive be utilized to drive the driven member forwardly, but it can be driven in a reverse direction merely by varying the number of teeth in the ring gears 29 and 34, or the number of teeth in the gears 13 and 16, or both. Thus, if the ring gear 29 had 110 teeth and the ring gear 34 had 108 teeth, and the gears 14 and 16 each had 20 teeth, as previously described, the hub 42 would rotate in a reverse direction to the shaft 13, once for every 352 revolutions of the shaft 13. Reduction drives have been designed in accordance with my invention, utilizing the same arrangement of gears and only varying the gear ratios between the ring gears and the gears on the driving shaft, that accomplish a reduction in speed as much as twenty-two thousand to one, without any complication or addition of any parts.

What I claim is:

1. A speed reduction device of the character described comprising a housing including an annular stationary portion, a side plate fixed thereto, and a second side plate spaced from said fixed side plate, a drive shaft extending into said housing, a pair of gears mounted between said side plates on said shaft to rotate therewith, a member rotatably mounted between said annular housing portion and said shaft, anti-friction bearing means between said rotatably mounted member and said shaft, a series of gears rotatably mounted on said rotatably mounted member and meshing with one of said gears on said shaft, a ring gear fixed on said annular housing portion with which the gears of said series mesh to rotate said rotatably mounted member about said shaft, a second series of gears rotatably mounted on said rotatably mounted member and meshing with the other of said gears on said shaft, a ring gear with which the gears of said second series mesh, anti-friction bearing means rotatably mounting said ring gear in said housing, means fixing said rotatably mounted ring gear to said second plate, and a driven shaft projecting from and fixed to said second side plate to rotate therewith.

2. A speed reduction device of the character described comprising a housing including an annular stationary portion, a side plate fixed thereto, and a second side plate spaced from said fixed side plate, a drive shaft extending into said housing, a pair of gears mounted between said side plates on said shaft to rotate therewith, a member rotatably mounted between said annular housing portion and said shaft, anti-friction bearing means between said rotatably mounted member and said shaft and between said rotatably mounted member and said annular housing portion, a series of gears rotatably mounted on one side of said rotatably mounted member and meshing with one of said gears on said shaft, a ring gear fixed on said annular housing portion with which the gears of said series mesh to rotate said rotatably mounted member about said shaft, a second series of gears mounted on the other side of said rotatably mounted member to rotate thereon independently of the gears of said first series and meshing with the other of said gears on said shaft, a ring gear with which the gears of said second series mesh, anti-friction bearing means rotatably mounting said ring gear in said housing, means fixing said rotatably mounted ring gear to said second side plate, and a driven shaft connected with said rotatably mounted ring gear to rotate therewith, said side plates cooperating to hold said series of gears in position on said rotatably mounted member.

3. A speed reduction device of the character described comprising a housing including an annular stationary portion, a side plate fixed thereto, and a second side plate spaced from said fixed side plate, a drive shaft extending into said housing, a pair of gears mounted between said side plates and closely adjacent the same on said shaft to rotate therewith, a member rotatably mounted between said annular housing portion and said shaft, anti-friction bearing means between said rotatably mounted member and said shaft and between said rotatably mounted member and said annular housing portion comprising a ball race confined between said pair of gears, a series of gears rotatably mounted on one side of said rotatably mounted member and meshing with one of said gears on said shaft, a ring gear fixed on said annular housing portion with which the gears of said series mesh to rotate said rotatably mounted member about said shaft, a second series of gears rotatably mounted on said rotatably mounted member on the opposite face thereof from said first series of gears and meshing with the other of said gears on said shaft, a ring gear with which the gears of said second series mesh, anti-friction bearing means mounting said ring gear to rotate in a fixed path in said annular housing portion, and a driven shaft projecting from and fixed to said second side plate to rotate therewith, the ratio between the one gear on said shaft and said fixed ring gear being different from the ratio between the other gear on said shaft and said rotatably mounted ring gear, said side plates cooperating to hold said series of gears in position on said rotatably mounted member and engaging said annular housing portion to provide a grease retaining chamber for all said gears.

LESLIE G. BOWEN.